(12) United States Patent
Ashmawi et al.

(10) Patent No.: US 10,000,299 B2
(45) Date of Patent: Jun. 19, 2018

(54) SELF-REPAIR STRUCTURES AND METHODS FOR MAKING THE SAME

(71) Applicant: THE BOEING COMPANY, Chicago, IL (US)

(72) Inventors: Waeil M. Ashmawi, Bellevue, WA (US); Sahrudine Apdalhaliem, Seattle, WA (US)

(73) Assignee: THE BOEING COMPANY, Chicago, IL (US)

(*) Notice: Subject to any disclaimer, the term of this patent is extended or adjusted under 35 U.S.C. 154(b) by 279 days.

(21) Appl. No.: 14/838,442

(22) Filed: Aug. 28, 2015

(65) Prior Publication Data

US 2017/0057668 A1    Mar. 2, 2017

(51) Int. Cl.
| | |
|---|---|
| *B64F 5/00* | (2017.01) |
| *B29C 65/02* | (2006.01) |
| *B01J 35/06* | (2006.01) |
| *B64C 1/10* | (2006.01) |
| *B01J 31/06* | (2006.01) |
| *B29C 65/54* | (2006.01) |
| *B29C 65/48* | (2006.01) |
| *B29K 701/12* | (2006.01) |
| *B29L 9/00* | (2006.01) |
| *B29L 31/30* | (2006.01) |

(52) U.S. Cl.
CPC ............. *B64F 5/0081* (2013.01); *B01J 31/06* (2013.01); *B01J 35/06* (2013.01); *B29C 65/02* (2013.01); *B29C 65/4875* (2013.01); *B29C 65/54* (2013.01); *B64C 1/10* (2013.01); *B29K 2701/12* (2013.01); *B29K 2713/00* (2013.01); *B29L 2009/00* (2013.01); *B29L 2031/3082* (2013.01)

(58) Field of Classification Search
CPC .. B64C 1/06; B64C 1/10; B29C 65/02; B29C 65/4875; B29C 65/54; B01J 35/06; B01J 31/06
See application file for complete search history.

(56) References Cited

U.S. PATENT DOCUMENTS

| | | | |
|---|---|---|---|
| 9,193,433 B2 * | 11/2015 | Hugon | ................ B29C 65/5057 |
| 2002/0081415 A1 * | 6/2002 | Toi | ........................ B29C 70/443 |
| | | | 428/102 |

FOREIGN PATENT DOCUMENTS

WO    WO 2012156525 A1 *  11/2012  ......... B29C 65/5057

* cited by examiner

*Primary Examiner* — Catherine A. Simone
(74) *Attorney, Agent, or Firm* — Coats & Bennett, PLLC (57) ABSTRACT

Methods and apparatuses are disclosed relating to multilayer 3D textile composite materials containing self-healing resins for use as protective structures on stationary objects, and moving objects including, without limitation, vehicles including spacecraft and aircraft.

15 Claims, 13 Drawing Sheets

SELF-REPAIR STRUCTURES AND METHODS FOR MAKING THE SAME

TECHNOLOGICAL FIELD

The present disclosure relates generally to the field of aircraft construction, and, more specifically, methods and apparatuses for making structural components for aircraft.

BACKGROUND

Forward pressure bulkheads (FBP) form a forward portion of aircraft. Current forward bulkheads are typically flat, stiffened structures are made from aluminum alloys. Aluminum alloys have been used with the understood acceptable tradeoff of strength (aluminum alloys are not as strong as other materials) for weight (the relatively light mass of aluminum alloys being desirable for meeting aircraft weight demands). At a minimum, the bulkhead structure must withstand an outward force in excess of the cabin pressure. In addition, the bulkhead structure must be strong enough to prevent an object from entering the aircraft from the outside if the aircraft is impacted. Typical objects that routinely impact the bulkheads include, for example, birds. Upon impact, the bulkhead may incur damage of varying degrees. For example, at a minimum, a bird strike to the bulkhead can require aircraft maintenance once the aircraft returns to the ground. However, this incurs significant lost service time. In addition, a bird strike of sufficient force penetrating the bulkhead and impacting the flight controls can result in emergency landings or can further lead to in-air failure of the aircraft.

An improved aircraft forward pressure bulkhead design comprising materials that can better withstand the impact of an object in flight would be highly desirable.

BRIEF SUMMARY

According to one aspect, the present disclosure is directed to a method for making a structure comprising assembling a first layer comprising a three-dimensional textile composite material, with the three-dimensional textile composite material comprising an interior surface and an exterior surface; assembling at least one fiber-containing stiffener, with the fiber-containing stiffener comprising a three-dimensional textile composite material, with the fiber-containing stiffener comprising an interior surface and an exterior surface; and joining the interior surface of the fiber containing stiffener and the exterior surface of the first layer.

According to a further aspect, at least one of the first layer and the fiber-containing stiffener has a domed configuration.

In yet another aspect, the step of joining the fiber-containing stiffener and the first layer comprises the step of joining the fiber-containing stiffener to the exterior surface of the first layer.

In another aspect, a plurality of fiber-containing stiffeners is joined to the first layer.

In yet another aspect, the step of joining the fiber-containing stiffener to the exterior surface of the first layer comprises the step of thermo-stamping the fiber-containing stiffener to the first layer.

In a further aspect, the three-dimensional textile composite material comprises a thermoplastic material.

In another aspect, the thermoplastic material comprises poly(p-phenyl sulfide), polyethylenimine, polyetherketone ketone, polyetherether ketone, and combinations thereof.

In yet another aspect, substantially all of the interior surface of the fiber-containing stiffener is in contact with the exterior surface of the first layer.

In still another aspect, before the step of joining the fiber-containing stiffener to the exterior surface of the first layer, a predetermined amount of resin-containing material is introduced to a cavity formed proximate to a portion of the interior surface of the fiber-containing stiffener.

In another aspect, the resin-containing material comprises nanoparticles.

In a still further aspect, the resin-containing material further comprises a catalyst.

In another aspect, the three-dimensional textile composite material comprises an orthogonal three-dimensional weave, with the weave comprising a predetermined z-directional reinforcement.

In yet another aspect, the disclosure is directed to a method for repairing a component of an aircraft during flight comprising the steps of making an aircraft component, with the component comprising a first layer comprising a three-dimensional textile composite material, with the three-dimensional textile composite material comprising an interior surface and an exterior surface and at least one fiber-containing stiffener, with the fiber containing stiffener comprising a three-dimensional textile composite material, with the fiber-containing stiffener comprising an interior surface and an exterior surface, and the fiber-containing stiffener located proximate to the exterior surface of the first layer, and a cavity between the exterior surface of the first layer and the interior surface of the fiber-containing stiffener, with the cavity comprising a predetermined amount of a resin-containing material, and with the resin-containing material comprising a catalyst. The aircraft component is then located at a predetermined location on the aircraft. At least a portion of the catalyst is then activated in the resin-containing material, and the resin-material is then cured.

A further aspect of the present disclosure is directed to a material comprising a first layer comprising a three-dimensional textile composite material with the three-dimensional textile composite material comprising an interior surface and an exterior surface; at least one fiber-containing stiffener, with the fiber-containing stiffener comprising a three-dimensional textile composite material, and the fiber-containing stiffener comprising an interior surface and an exterior surface, wherein at least a portion of the fiber-containing stiffener is located proximate to the exterior surface of the first layer.

In another aspect, at least one of the first layer and the fiber-containing stiffener has a domed configuration.

In yet another aspect, the fiber-containing stiffener is joined to the exterior surface of the first layer.

In a further aspect, the fiber-containing stiffener is joined to the exterior surface of the first layer.

In another aspect, a plurality of fiber-containing stiffeners is joined to the first layer.

In a further aspect, the three-dimensional textile composite material comprises a thermoplastic material.

In another aspect, the thermoplastic material comprises poly(p-phenyl sulfide), polyethylenimine, polyether ketone ketone, polyetherether ketone, and combinations thereof.

In yet another aspect, substantially all of the interior surface of the fiber-containing stiffener is located proximate to the exterior surface of the first layer.

In another aspect, at least a portion of the interior surface of the-fiber-containing stiffener and at least a portion of the exterior surface of the first layer together form the boundary of a cavity.

In another aspect, the cavity comprises a predetermined amount of a resin-containing material.

In another aspect, the resin-containing material comprises nanoparticles.

In a still further aspect, the resin-containing material further comprises a catalyst.

In another aspect, the three-dimensional textile composite material comprises an orthogonal three-dimensional weave, with the weave comprising a predetermined z-directional reinforcement.

A further aspect contemplates a component comprising a material comprising a first layer comprising a three-dimensional textile composite material with the three-dimensional textile composite material comprising an interior surface and an exterior surface, a fiber-containing stiffener, with the fiber-containing stiffener comprising a three-dimensional textile composite material, and the fiber-containing stiffener comprising an interior surface and an exterior surface, wherein at least a portion of the fiber-containing stiffener is located proximate to the exterior surface of the first layer.

In another aspect, a stationary structure may comprise the component.

In yet another aspect, a vehicle may comprise the component.

In a further aspect, the vehicle comprises a manned aircraft, a manned spacecraft, a manned rotorcraft, an unmanned aircraft, an unmanned spacecraft, an unmanned rotorcraft, a manned terrestrial vehicle, an unmanned terrestrial vehicle, a manned waterborne vehicle, an unmanned waterborne vehicle, or combinations thereof.

BRIEF DESCRIPTION OF THE DRAWINGS

Having thus described variations of the disclosure in general terms, reference will now be made to the accompanying drawings, which are not necessarily drawn to scale, and wherein:

DETAILED DESCRIPTION

According to one aspect, the present disclosure is directed to methods and apparatuses for improving the performance of forward bulkheads for vehicles by using a thermoplastic three-dimensional orthogonal textile composite material in place of the commonly-accepted reinforced metallic materials or laminated composite reinforcement materials presently used to make such bulkheads.

Two-dimensional weaving processes consist of placing weft yarns between warp yarns. In three-dimensional (3D) weaving processes, the additional yarn (z-binder) is woven through the thickness of the woven preform. Three-dimensional (3D) woven preforms can be manufactured according to known commercial processes.

It has now been determined that three-dimensionally textile composite materials, such as, for example, 3D woven thermoplastic materials, provide a continuity and mechanical interlacing in their geometry that is particularly resistant to crack propagation at the yarn intersection. This feature has now been shown to significantly increase fatigue life of parts and components manufactured from 3D textile composite thermoplastic materials, such as, for example, 3D woven/weave materials.

According to one aspect, in the manufacture of forward bulkheads on aircraft, as well as other structural components where metallic materials are typically used, the automation of weaving processes used to make the replacement 3D textile composite thermoplastic material offer many benefits, namely: reducing the manufacturing costs, reducing labor hours, reducing scrap rates and expense, reducing inspection times, lighter overall weight, increasing reproducibility and improving quality control. In addition, the 3D textile composite thermoplastic materials of the present disclosure, including, for example, 3D woven/weave materials when manufactured as forward pressure bulkheads, display increased strength, and otherwise possess desirable properties in terms of shock absorption and impact deflection when struck during operation (e.g. in flight, etc.). Such increased performance of the 3D textile composite thermoplastic materials of the present disclosure also results in decreased equipment down-time for repair and ease of replacement.

According to one aspect, a first layer, also referred to equivalently herein as a base layer, is made from 3D textile composite thermoplastic materials, and shaped after weaving, or is shaped during the weaving operation to incorporate a spline or predetermined curved orientation, referred to equivalently herein as a dome. The base layer has an interior surface and an exterior surface.

According to further aspects, additional components, referred to as fiber-containing stiffeners, are also dome-shaped and are also made from 3-D textile composite thermoplastic materials. The stiffeners have an interior surface and an exterior surface. According to further aspects, the area bounded by the interior surface of the stiffeners and the exterior surface of the first (or base) layer may form the boundary of a cavity.

In general, according to the present disclosure, kinetic energy has now been shown to dissipate through the dome-shaped stiffeners, with reduced impact forces transferred to the base layer dome in an efficient, predictable and predetermined fashion. Through the selection of the material chosen and the 3D weave employed, the stiffeners and the base layer are designed to have a desired and predetermined relative flexural rigidity of from about 16 msi to about 21 msi. The stiffeners are deformable upon impact, and act as primary barriers to deflect foreign objects impacting the structure comprising the disclosed apparatuses. Accordingly, the stiffeners of the present disclosure in concert with the base layer are able to dissipate striking forces equivalent to those ranging from about 7 to about 15 pounds of bird weight with an impact velocity ranging from about 200 to about 300 knots. However, it is understood that adjustments can be made to the contemplated methods, apparatuses and systems disclosed herein that will enable the stiffeners to withstand striking forces in excess of those set forth above.

According to further aspects, when impacted, the apparatuses of the present disclosure will predictably deform and otherwise predictably deflect the impacting objects in a predetermined fashion. At particular airspeeds, it is contemplated that impacting objects may have a force that is sufficient to exceed the disclosed apparatuses' ability to deform and deflect the objects' force and may therefore sustain some amount of damage. When this occurs, it is contemplated that the apparatuses of the present disclosure may sustain a crack, rupture or other breach in the stiffener's exterior surface. However, so long as the result of the impact only produces a crack that does not penetrate the entire thickness of the stiffener, the remainder of the 3D textile composite thermoplastic material is designed to retain its overall form and function, and can be repaired or replaced during routine or special maintenance, for example, when the aircraft returns safely to the ground after a scheduled flight or mission.

According to further aspects, the area bounded by the interior surface of the stiffeners and the exterior surface of the first (or base) layer forms a boundary of a cavity that is filled with a resin-based material. The resin-based material may comprise a compound including, without limitation dicyclopentadiene (DCPD), alkyl glycidyl ether diluted bisphenol-A (DGEBA based epoxy resin such as, for example (EPONYM 182), or other conventional resins.

The resin-based material may comprise particles such as, for example and without limitation, nanoparticles that are components in a resin-based system to cure or otherwise change the properties of the resin upon activation. For example, according to one aspect, the resin based system may comprise catalysts or other system components that may be encapsulated, or that may otherwise be activated upon sustaining impact forces ranging from about 60,000 lbf to about 72,000 lbf. According to further aspects, if impact forces exceeding a particular known structural threshold of the 3D textile composite thermoplastic material are realized on the surface of the stiffener, the resin-based system will be activated through the release and/or activation of components in the resin-based system, including, for example, nanoparticles present in the resin-based system.

In this way, if a particular impact force occurs that designers believe would penetrate or otherwise breach the thickness of the stiffener, the resin-based system is activated, substantially immediately acting as a sealant that is able to fill and/or seal in any crack, rupture, separation, or other breach caused by the impact of the object.

Aspects comprising the self-sealing apparatuses and methods of the present disclosure are structurally efficient under pressure, including, without limitation, outward fuselage pressure in an aircraft, but also inward pressure such as the inward pressure that might be experienced under water, either at or near the surface, or including depths typically sustained by submarines and other underwater craft. Such pressures are understood to range from about 9.53 psi to about 9.93 psi differential pressure.

According to further aspects, the geometric design of the dome is a curved configuration that in certain examples may be a spline surface. Such a design efficiently transfers pressure loads as membrane stress. This observed property of the geometry applied to the apparatuses and methods of the present disclosure creates a design that is significantly superior in performance and protection than the conventional planar plate constructions made from metals. In addition, it is noted that the desired geometric dome or spline shape can be manufactured by appropriately modifying the textile composite process to achieve the appropriate degree of the 3D textile composite products' moldability.

The stiffener's dome shape, geometry and orientation offers enhanced properties, such as, for example, strength, stability, damage tolerance and load path optimization while maintaining substantially symmetric structural geometry. Such geometry and orientation has now been shown to be particularly advantageous over conventional (e.g. planar) orientations and geometry.

According to one aspect, the domes created in the stiffeners comprise at least one layer, and more preferably, from about 2 to about 5 layers of thermoplastic 3D textile composite or braided fabric. The thermoplastic material includes, without limitation, poly(p-phenyl sulfide); polyethylenimine; polyetherether ketone; polyetherketone ketone; etc., and combinations thereof.

According to another aspect, the first layer, or base layer includes at least one layer, and more preferably multiple layers, of thermoplastic 3D textile composite or braided fabric. The thermoplastic material includes, without limitation, poly(p-phenyl sulfide); polyethylenimine; polyetherether ketone; polyetherketone ketone; etc., and combinations thereof.

One contemplated method of joining the stiffeners and first layer together comprises a thermo-stamping process and device that may be automated and managed by a digital control system to regulate the stiffener's dimension, geometry, fabric-induced drapability, continuity, etc., of the 3D surface, for example, relative to the dimensions, geometry, fabric-induced drapability, continuity of the 3D surface of the first layer to which the stiffener is joined.

Conventional processes are known or may be modified to fabricate the materials of the present disclosure into components including, without limitation, aircraft, spacecraft and watercraft bulkheads, as well as components for terrestrial vehicles as well as stationary structures that may sustain impact such as, for example, wind turbines, generators, etc. In general, and according to one non-limiting aspect, a useful process includes the following. First, 3D weaving (or braiding) substantially planar sheets for the first layer and the stiffeners made from thermoplastic material such as, for example slit thermoplastic tapes (or, in dry form, fiber comingled with resin). Next, the first layer and stiffeners are placed into a metallic or other suitable material compression molding device to achieve the desired geometry, shape and dimension. The first layer and stiffeners are then consolidated on separate toolings at a temperature ranging from about 700° F. to 800° F. A lower tooling may be fixed while the upper tooling is movable or vice versa, or both toolings may be moveable. Both toolings are heated to the desired target temperature inside a control chamber to prevent heat loss for energy conservation. The top tooling is then lowered down onto the first layer and/or the stiffeners to exert a desired pressure thereon and at a temperature that is sufficient to drive the charge into the desired component shape (e.g. bulkhead). Depending on the thickness of the first layer and the stiffeners, the hold time ranges appropriately, such as, for example, from about 15 minutes to about an hour to insure that substantially uniform temperature is established throughout the first layer.

When it is desirable to incorporate a resin-based material into a cavity formed between the interior surface of the stiffener and the exterior surface of the first layer, the resin-based material may include, without limitation, nanoparticles, nanocapsules etc., and are then placed into the concave (interior surface) of the stiffener, or otherwise appropriately loaded, and the stiffeners are then placed proximate to the first layer for consolidation into the finished component via joining, adhering, welding etc. as desired, including, for example via thermo-stamping.

According to one aspect, the apparatuses of the present disclosure, when used to make aircraft bulkheads, resulted in a weight reduction over conventional flat metallic bulkhead plates, ranging, for example, from about 20% to about 40% weight reduction. Further, the 3D textile composite architecture increases damage resistance and through-thickness strength, and the z-yarns substantially arrest crack growth between layers of the 3D fiber composite material.

According to further aspects, the bulkheads fabricated using the methods and apparatuses of the present disclosure have multiple stages of energy absorption. In the event of an impact with an object, a high speed incoming object makes initial contact at the stiffener surface. At this initial contact, the stiffener predictably deflects/deforms to absorb initial impact energy. As the stiffener continues to deflect to a point of nearly complete "flat", or near total compression, then the majority of the impact load will be transferred to the overall bulkhead first layer material. The first layer will predictably deflect further and absorb a majority of the impact load, and transfer the load to adjacent surfaces for more complete energy dissipation.

Aspects of the present apparatuses therefore result in the absorption of kinetic energy from an impact velocity of, for example, a foreign object strike, through the design, geometry, and manufacture of the stiffener and first layer construction. Multiple stages impact energy absorption including, without limitation, local out-of-plane deformation and global dome bending of both the stiffener and the first layer (base layer). The stiffeners and base layer continue to withstand further deformation and otherwise arrest damage propagation and rupture of both the stiffeners and the first/base layer.

According to a further aspect, when the cavity between the stiffener and the first layer is filled with a resin-based material comprising reactive particles, such as, for example, nanoparticles, and the resin-based material acts as a "self-healing" material to repair damage to the stiffeners and the first layer. As a result, the "self-healing material assists in averting in-flight failure of an aircraft due to de-pressurization, as well as obviating time-consuming "grounding" of a vehicle for manual repairs that normally occurs for less catastrophic failures.

Figure 1:
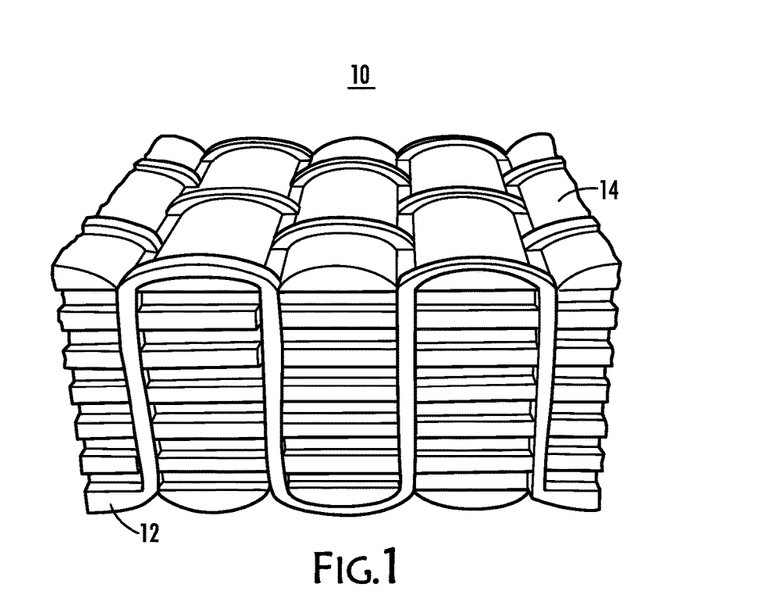
FIG. 1 is a close-up view of one aspect of the present disclosure showing as an example of a textile composite material, a three-dimensional woven/weave material comprising an orthogonal three-dimensional weave material.
Figure 2:
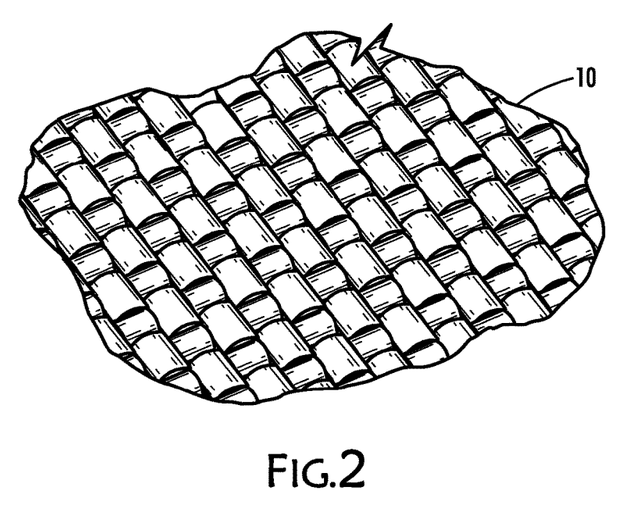
FIG. 2 is a perspective view of the orthogonal three-dimensional weave material of FIG. 1.

FIG. 1 is an enlarged view of an aspect of the present disclosure showing a 3D orthogonal weave material 10 used in the manufacture of the first layer comprising the 3D textile composite material (also referred to as the base layer), and the fiber-containing stiffener. The z-directional reinforcement 12 is shown migrating through the fiber weave to achieve the desired orthogonal weave orientation through the textile composite bundle 14. FIG. 2 is a perspective view of one section of the surface of the orthogonal weave material 10.

Figure 3A:
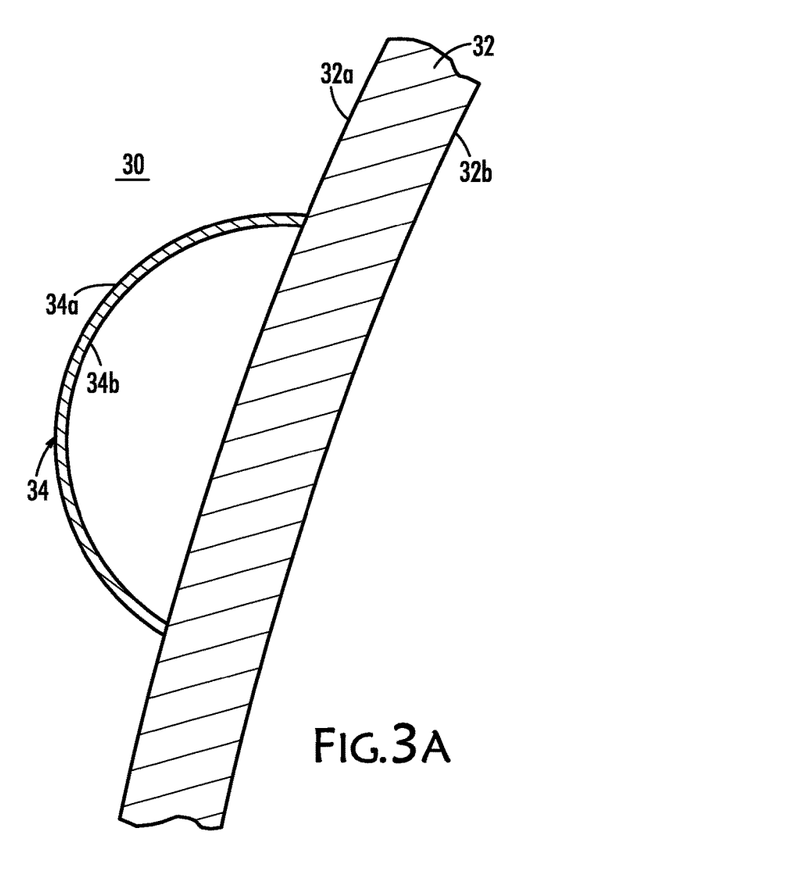
FIGS. 3A and 3B are schematic cross-sectional side view drawings of aspects of the disclosure showing a domed base layer with a domed fiber-containing stiffener in place.
Figure 3B:
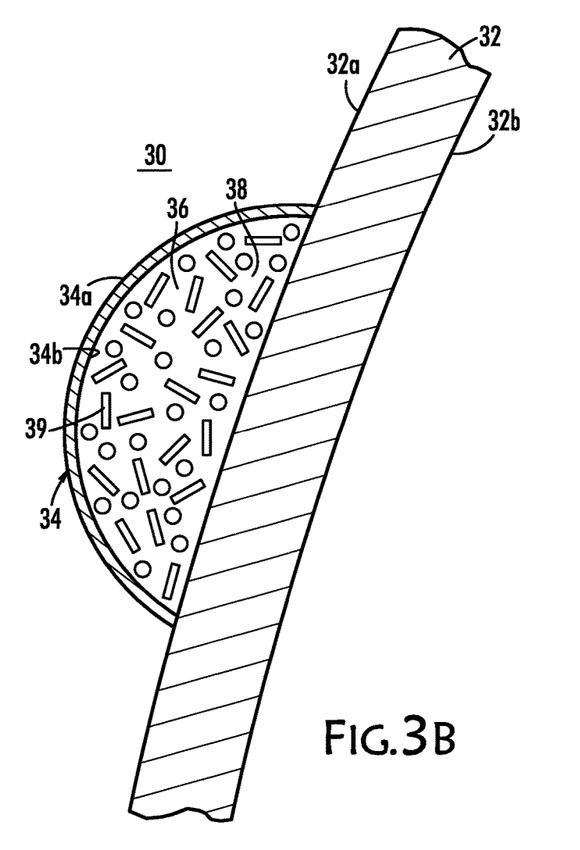

FIGS. 3A and 3B are enlarged cross-sectional views of aspects of the present disclosure showing an assembly 30 comprising a first layer 32 of 3D textile composite material adhered to a fiber-containing stiffener 34. Both the first layer 32 and the stiffener material 34 comprise the 3D textile composite material 10 as shown in FIGS. 1 and 2.

As shown in FIG. 3A, the first layer 32 has an exterior side 32a and an interior side 32b. The fiber stiffener 34 has an exterior side 34a and an interior side 34b. The first layer 32 is shown as a section comprising an arc, and it is understood that the first layer maintains a three-dimensional curved orientation such that the entire first layer is in the shape of a dome. The fiber-containing stiffener 34 is shown as a section comprising an arc, and it is understood that the fiber-containing stiffener 34 maintains a three-dimensional curved orientation such that the entire fiber-containing stiffener is in the shape of a dome. A cavity 36 is formed between the interior side 34b of the fiber-containing stiffener 34 and the exterior side 32a of the first layer 32. FIG. 3B shows an aspect of the disclosure wherein cavity 36 contains a resin-containing material 38 comprising encapsulated catalyst particles 39. It is understood that the particles may be nanoparticles.

FIGS. 4-8 are enlarged cross-sectional views of aspects of the present disclosure showing the protective features of the structural material upon impact of an object and the activation of the a resin-containing material contained within a cavity proximate to the fiber-containing stiffener and the first layer.

Figure 4:
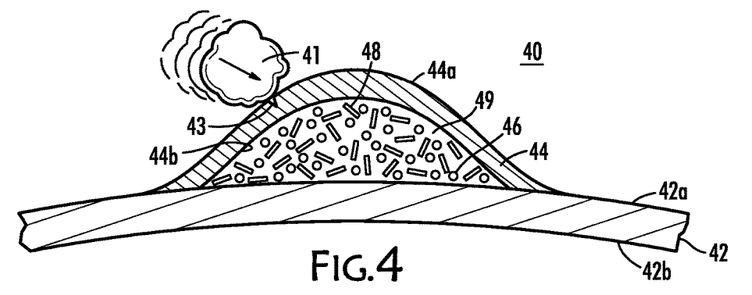
FIGS. 4-8 are schematic cross-sectional side views of aspects shown in FIG. 3B showing an object impacting the fiber-containing stiffener.

In FIG. 4, an object 41 is shown impacting protective array 40. More specifically, object 41 is shown impacting the exterior surface 44a of fiber-containing stiffener 44. A crack 43 in the fiber-containing stiffener occurs due the impact of the object 41, but does not penetrate the thickness of the fiber-containing stiffener 44. As shown in FIG. 4, the first layer 42 has an exterior side 42a and an interior side 42b. The fiber stiffener 44 has an exterior side 44a and an interior side 44b. The first layer 42 is shown as a section comprising an arc, and it is understood that the first layer maintains a three-dimensional curved orientation such that the entire first layer is in the shape of a dome. The fiber-containing stiffener 44 is shown as a section comprising an arc, and it is understood that the fiber-containing stiffener 44 maintains a three-dimensional curved orientation such that the entire fiber-containing stiffener is in the shape of a dome. A cavity 46 is bounded by the interior side 44b of the fiber-containing stiffener 44 and the exterior side 42a of the first layer 42. Cavity 46 contains a resin-containing material 49 comprising encapsulated catalyst particles 48. As shown in FIG. 4, the resin-containing material 49 has not been activated indicating that the impact sustained by the protective array did not impact the protective array with a force sufficient to activate the resin-containing material 49.

Figure 5:
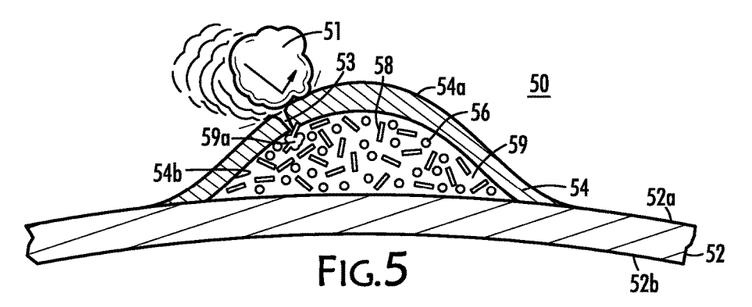
Figure 6:
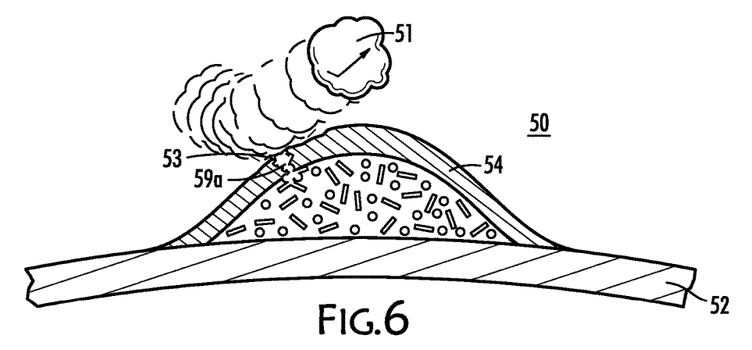

In FIGS. 5-8, an object 51 is shown impacting protective array 50. More specifically, object 51 is shown impacting the exterior surface 54a of fiber-containing stiffener 54. In this example, a crack 53 in the fiber-containing stiffener occurs due the impact of the object 51, and penetrates the thickness of the fiber-containing stiffener 54. As shown in FIG. 5, the first layer 52 has an exterior side 52a and an interior side 52b. The fiber stiffener 54 has an exterior side 54a and an interior side 54b. The first layer 52 is shown as a section comprising an arc, and it is understood that the first layer maintains a three-dimensional curved orientation such that the entire first layer is in the shape of a dome. The fiber-containing stiffener 54 is shown as a section comprising an arc, and it is understood that the fiber-containing stiffener 54 maintains a three-dimensional curved orientation such that the entire fiber-containing stiffener is in the shape of a dome. A cavity 56 is formed between the interior side 54b of the fiber-containing stiffener 54 and the exterior side 52a of the first layer 52. Cavity 56 contains a resin-containing material 59 comprising encapsulated catalyst particles 58. As shown in FIG. 5, the resin-containing material 59 has been activated near the site of the crack 53 indicating that the impact sustained by the protective array impacted the protective array with a force sufficient to activate the resin-containing material 59. FIGS. 5 and 6 show the resin-containing material being activated as encapsulated catalyst particles 59a rupture, releasing the catalyst from the encapsulation (e.g. shell material) into the resin-containing material 59.

Figure 7:
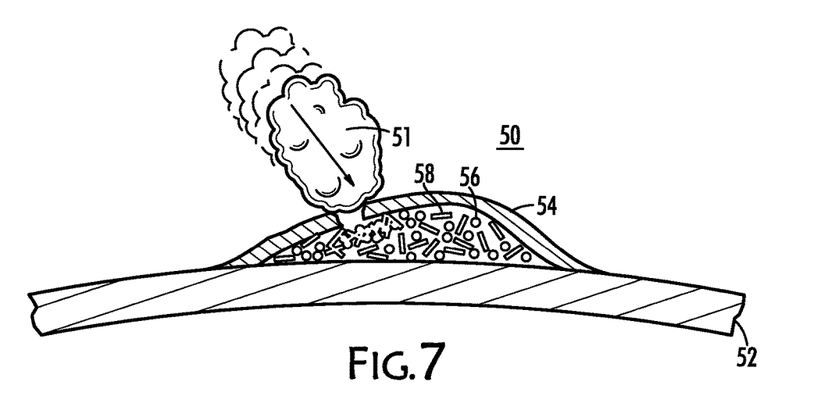
Figure 8:
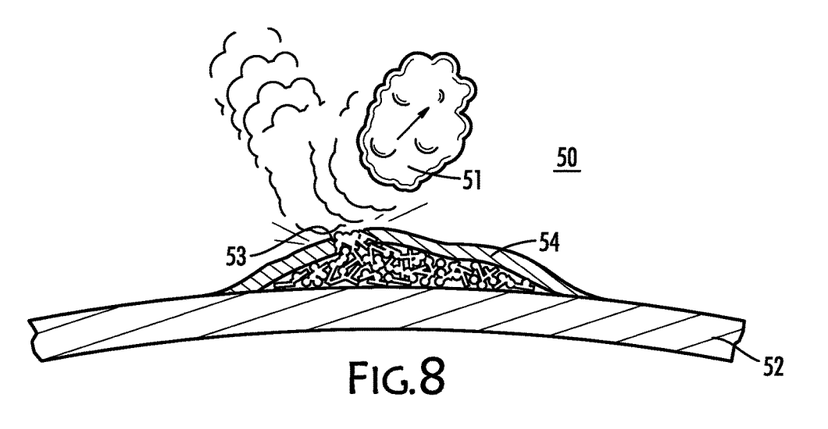

FIG. 7 shows the continued activation of the resin-containing material 59 within cavity 56 after or substantially coincident with the impact of object 51. FIG. 7 also shows the protective deformation of the dome-shaped fiber-containing material 54. FIG. 8 shows the self-healing properties of the protective array 50, where the resin-containing adhesive 58 has now begun to cure as it migrates to "fill-in" the crack 53 in the fiber-containing material 54.

Figure 9:
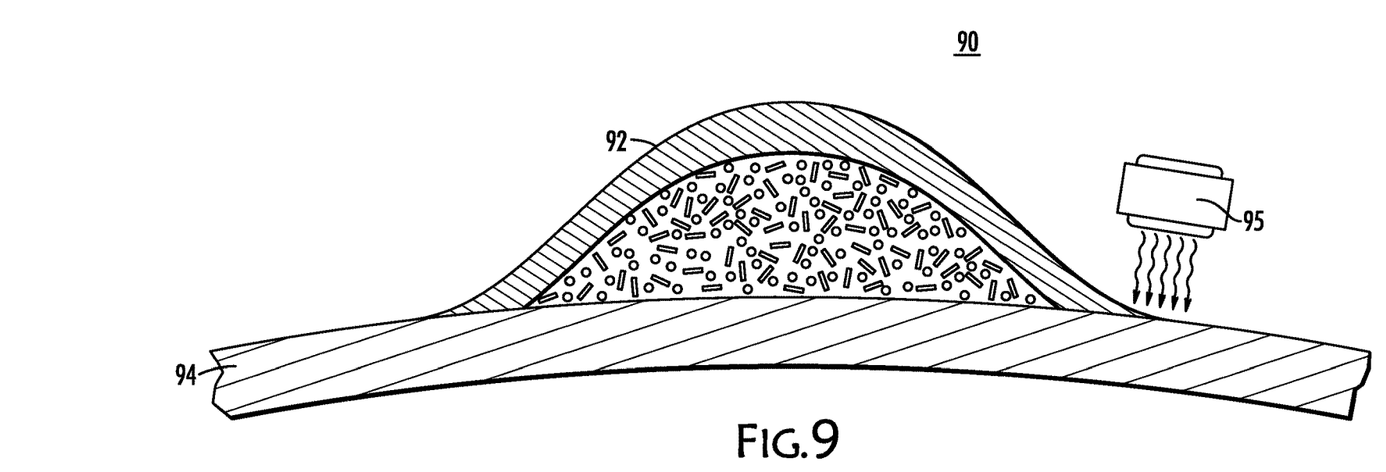
FIG. 9 is a schematic cross-sectional side-view drawing showing a thermo-stamp device operating to join the fiber-containing stiffener to the domed base layer.

FIG. 9 shows a method of manufacturing the protective array 90 according to aspects of the present disclosure. In FIG. 9, the fiber-containing stiffener 92 is shown being adhered to the exterior surface 94a of first layer (base layer) 94. A thermo-stamp device 95 is shown radiating a predetermined amount of heat to join the fiber-containing stiffener 92 to the exterior surface of first layer (base layer) 94. The thermo-stamp device 95 is understood to radiate enough heat to join the thermoplastic fibers comprising the fiber-containing stiffener 92 to the thermoplastic fibers comprising the first layer (base layer) 94. Though not shown, it is understood that the thermo-stamping process, or any desired process for joining thermoplastic textile composite materials together (as would be understood by one skilled in the field), may continue in any desired pattern such as, for example, circumferentially, until the perimeter of the fiber-containing stiffener is joined to the exterior surface of the first layer, as desired.

Figure 10:
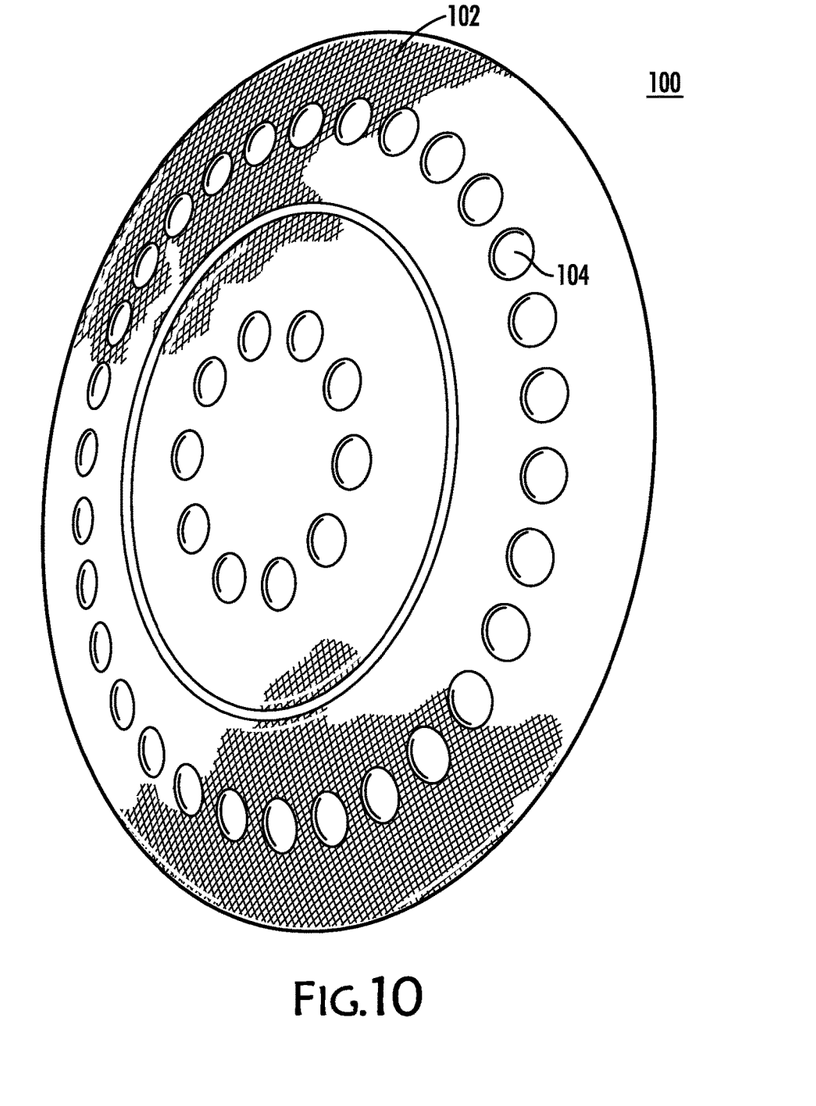
FIG. 10 is a perspective view of the domed base layer showing a plurality of fiber-containing stiffeners in place.
Figure 11A:
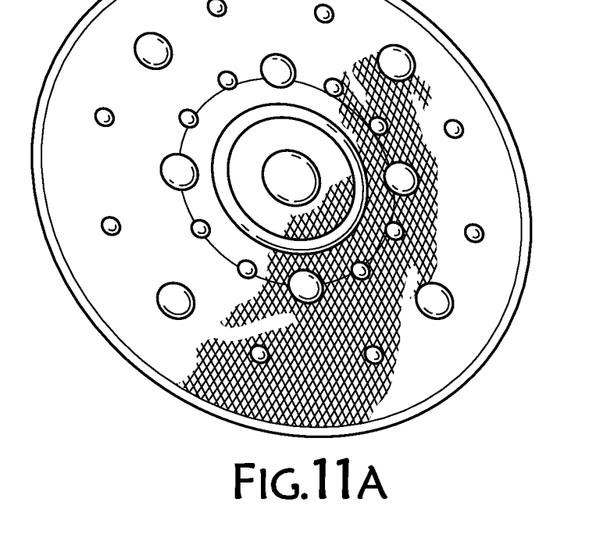
FIGS. 11A-11E are perspective views of various configurations of fiber-containing stiffeners in place on the domed base layer.
Figure 11B:
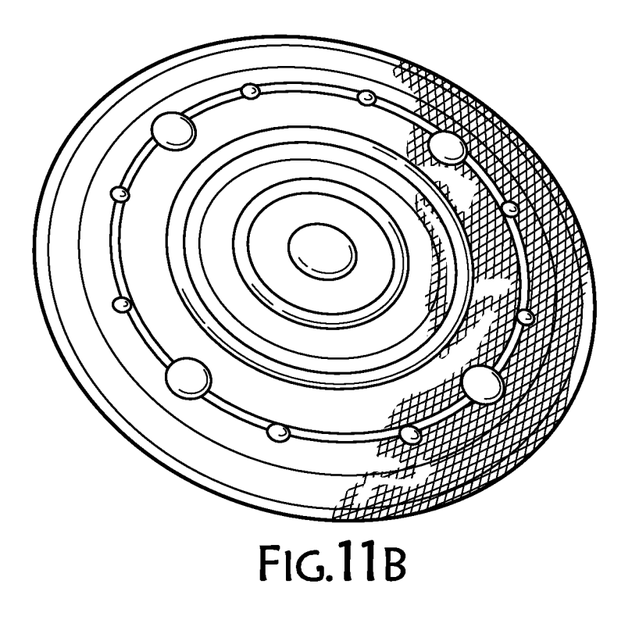
Figure 11C:
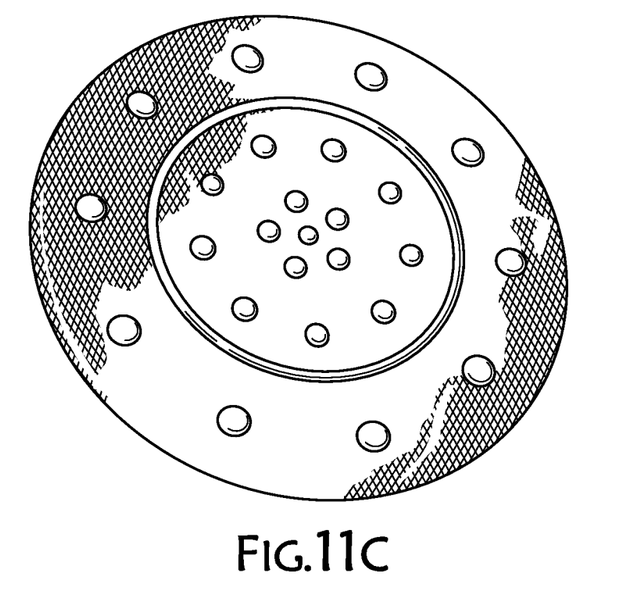
Figure 11D:
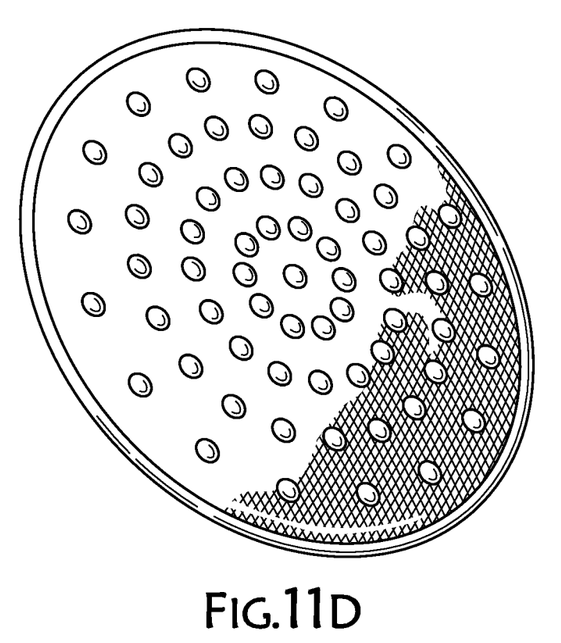
Figure 11E:
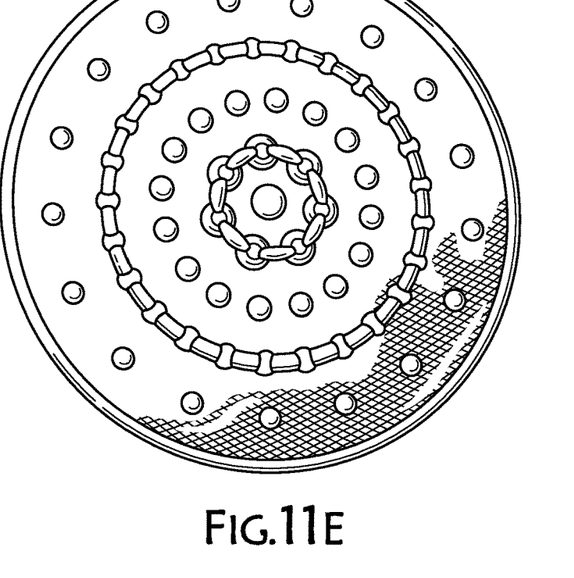

FIG. 10 is a perspective view of a protective bulkhead array 100 according to an aspect of the present disclosure. First layer 102 is shown in a domed orientation with a plurality of fiber-containing stiffeners 104 oriented about and adhered to the exterior surface of first layer 102. It is understood that the fiber-containing stiffeners 104 also comprise a domed orientation.

Figure 12:
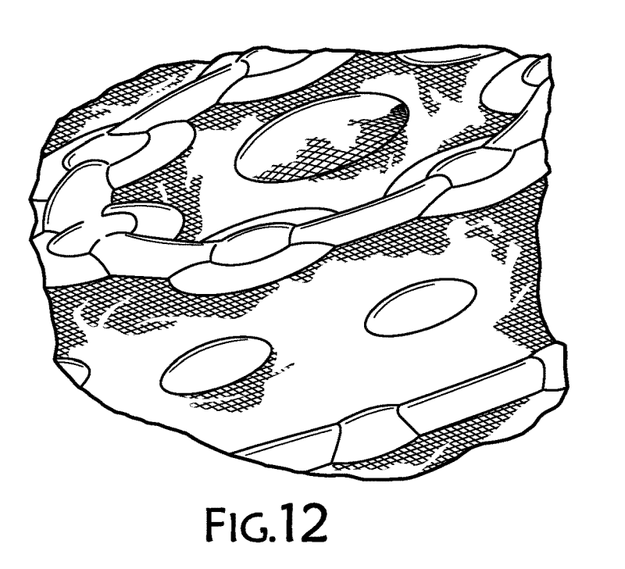
FIG. 12 is a close-up view of fiber containing stiffeners in place on the domed base layer.

FIGS. 11A-11E show additional protective bulkhead arrays according to additional aspects of the present disclosure showing alternative desired placements of a plurality of the fiber-containing stiffeners placed in various geometries and orientations about the exterior surface of the first layer It is understood that FIGS. 11A-11E are shown for illustrative purposes only and are provided without imposing any limitations on additional orientations and placements of the fiber-containing stiffeners that are contemplated according to the present disclosure. FIG. 12 is an enlarged perspective view of an aspect shown in FIG. 11E.

Figure 13:
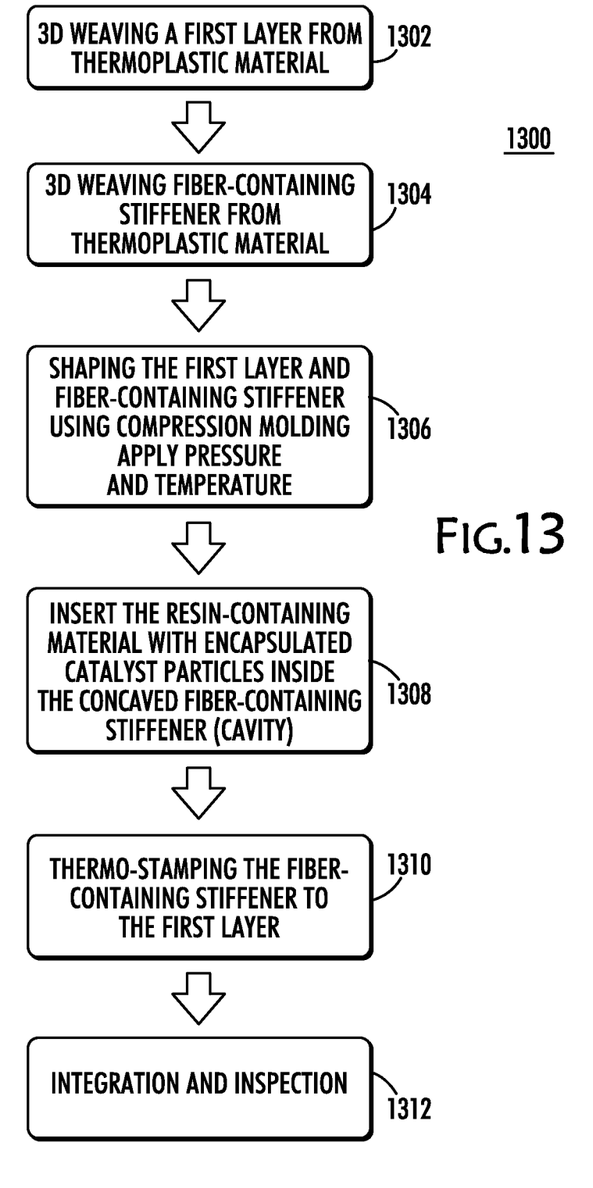
FIG. 13 is a flow chart showing the process for one aspect of the disclosure.

FIG. 13 is a flow diagram outlining an aspect of the present disclosure where a method is described for making a protective component, such as, for example, a protective forward bulkhead array 1300. Step 1302 describes 3D weaving a first layer from thermoplastic material such as, for example, thermoplastic slit tape. Step 1304 shows 3D weaving a fiber-containing stiffener from thermoplastic material such as, for example thermoplastic slit tape. In step 1306, the fiber-containing stiffener and the first layer are shaped into a dome configuration using compression molding with increased temperature and pressure being applied. The 3D woven thermoplastic material is understood to comprise an orthogonal weave. According to aspects comprising the self-healing resin-containing material, in step 1308 the resin-containing material with encapsulated catalyst particles is inserted into the concavity formed in the fiber-containing stiffeners in their domed-configuration (i.e. a cavity). In 1310 the fiber-containing stiffener is thermo-stamped to the first layer followed by integration into a component (e.g. forward pressure bulkhead) and inspection 1312.

Figure 14:
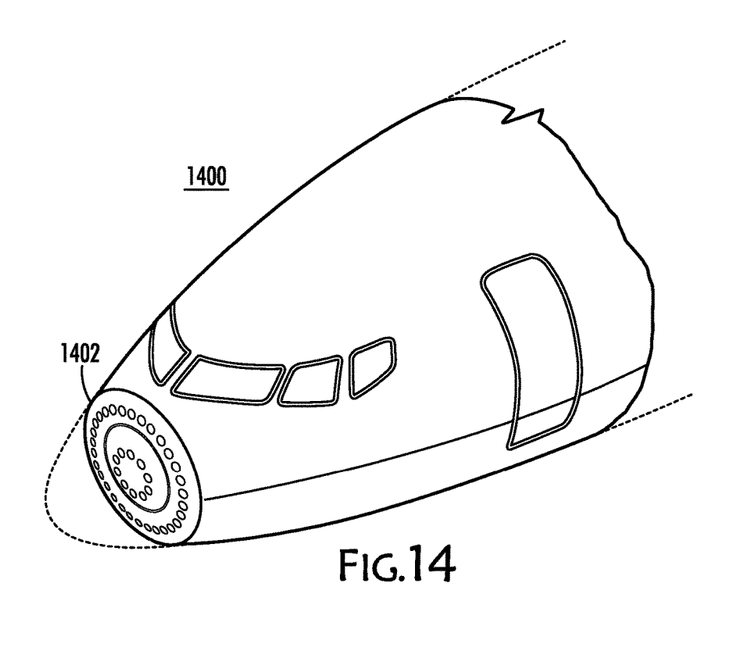
FIG. 14 is a perspective view of an aircraft showing a forward bulkhead component comprising aspects of the disclosed material.

FIG. 14 shows a drawing of a portion of an aircraft 1400 with the nose of the aircraft cut away to reveal the placement of a manufactured component comprising the materials according to aspects of the present application in place as a forward pressure bulkhead 1402.

It is further understood, according to aspects of the present disclosure, that the fiber-containing stiffeners may be integrated into the first layer during the 3D weaving process as an integral feature of the first layer. It is further understood that the fiber-containing stiffeners may be integrated into the first layer such that the entire exterior surface is substantially covered by the fiber-containing stiffeners, and are therefore present as a second layer substantially covering the first layer, subject to weight and/or other considerations.

With respect to use in terrestrial, marine (surface and sub-surface waterborne) and aircraft/spacecraft/rotorcraft vehicles (all or any of which may be manned or unmanned), according to aspects of the disclosure, the multilayer systems described herein allow for the overall design of such vehicles (e.g. weight, dimension, displacement, etc.) to be achieved independently of the ordinary concerns taken into account to mitigate sustained, periodic and otherwise expected and anticipated impacting forces encountered during vehicle operation. Such independence in design results in the elimination of "parasitic" weight distribution in such vehicles, further resulting in operational increases in range, speed and payload, etc., while decreasing fuel consumption. Further, aspects of the present invention can facilitate use of next generation materials as well as existing materials as candidate materials for use in the construction of such vehicles and even stationary structures, such as for example, generators, wind turbines, buildings, etc.

It is understood that the multilayered structures of the present disclosure may be incorporated into, adhered to, positioned to adjoin, or integrated with any load-bearing or non-load-bearing structure that is susceptible to impacting forces during operation. For example, according to certain aspects, the multilayered structure may be incorporated into a structure as laminate layers, for example, during manufacture of a structure. According to other aspects, the multilayered system may be bonded, or adhered to, or otherwise adjoin the inner surface of aircraft, skins, panels, stringers, frame components, etc., such as, for example as an addition via post-manufacture procedures, as would be readily understood by one skilled in the field. Indeed, aspects of the methods, systems apparatuses and structures of the present disclosure are contemplated as finding utility in any and all manned and unmanned vehicles including, without limitation, aircraft, spacecraft, rotorcraft, rockets, satellites, drones, terrestrial vehicles and surface and sub-surface waterborne vehicles, and combinations thereof.

When introducing elements of the present disclosure or exemplary aspects or embodiment(s) thereof, the articles "a," "an," "the" and "said" are intended to mean that there are one or more of the elements. The terms "comprising," "including" and "having" are intended to be inclusive and mean that there may be additional elements other than the listed elements. Although this disclosure has been described with respect to specific embodiments, the details of these embodiments are not to be construed as limitations. While the preferred variations and alternatives of the present disclosure have been illustrated and described, it will be appreciated that various changes and substitutions can be made therein without departing from the spirit and scope of the disclosure.

What is claimed is:

1. A method for making a structure comprising the steps of:
   assembling a first layer, said first layer comprising a three-dimensional textile composite material, said three-dimensional textile composite material comprising an interior surface and an exterior surface;
   assembling at least one fiber-containing stiffener, said fiber-containing stiffener comprising a three-dimensional textile composite material, and said fiber-containing stiffener comprising an interior surface and an exterior surface;
   wherein the fiber-containing stiffener is located proximate to the exterior surface of the first layer;
   wherein, at least a portion of the interior surface of the fiber-containing stiffener contacts the exterior surface of the first layer to form a boundary of a cavity;
   wherein the cavity comprises a predetermined amount of a resin-containing material, said resin-containing material comprising nanoparticles and a catalyst; and
   joining the fiber-containing stiffener to the exterior surface of the first layer.

2. The method of claim 1, wherein at least one of the first layer and the fiber-containing stiffener has a domed configuration.

3. The method of claim 1, wherein a plurality of fiber-containing stiffeners are joined to the exterior of the first layer.

4. The method of claim 1, wherein the step of joining the fiber-containing stiffener to the exterior surface of the first layer further comprises the step of thermo-stamping the fiber-containing stiffener to the first layer.

5. The method of claim 1, wherein the three-dimensional fiber material comprises a thermoplastic material.

6. The method of claim 5, wherein the thermoplastic material comprises: poly(p-phenyl sulfide); polyethylenimine; polyetherketone ketone; polyetherether ketone, or combinations thereof.

7. The method of claim 1, wherein substantially all of the interior surface of the stiffener is in contact with the exterior surface of the first layer.

8. The method of claim 1, wherein the three-dimensional textile composite material comprises an orthogonal three-dimensional weave, said weave further comprising a predetermined z-directional reinforcement.

9. A method for repairing the exterior of an aircraft component during flight comprising the steps of:
   making an aircraft component, said component comprising:
   a first layer, said first layer comprising a three-dimensional textile composite material, said three-dimensional textile composite material comprising an interior surface and an exterior surface; and
   at least one fiber-containing stiffener, said fiber-containing stiffener comprising a three-dimensional textile composite material, and said fiber-containing stiffener comprising an interior surface and an exterior surface, and said fiber-containing stiffener interior surface located proximate to the exterior surface of the first layer;
   a cavity between the exterior surface of the first layer and the interior surface of the fiber-containing stiffener, said cavity comprising a predetermined amount of a resin-containing material, said resin-containing material comprising nanoparticles and a catalyst; and
   locating the aircraft component at a predetermined location on the aircraft; activating at least a portion of the catalyst in the resin-containing material; and curing the resin-containing material.

10. A material comprising:
    a first layer, said first layer comprising a three-dimensional textile composite material, said three-dimensional textile composite material comprising an interior surface and an exterior surface; and
    at least one fiber-containing stiffener, said fiber-containing stiffener comprising a three-dimensional textile composite material, and said fiber-containing stiffener comprising an interior surface and an exterior surface;
    wherein the fiber-containing stiffener is located proximate to the exterior surface of the first layer;
    wherein, at least a portion of the interior surface of the fiber-containing stiffener contacts the exterior surface of the first layer to form a boundary of a cavity; and
    wherein the cavity comprises a predetermined amount of a resin-containing material, said resin-containing material comprising nanoparticles and a catalyst.

11. The material of claim 10, wherein at least one of the first layer and the fiber-containing stiffener has a domed configuration.

12. The material of claim 10, wherein the fiber-containing stiffener is joined to the exterior surface of the first layer.

13. The material of claim 10, wherein a plurality of fiber-containing stiffeners is joined to the exterior of the first layer by thermo-stamping the fiber-containing stiffener to the first layer.

14. The material of claim 10, wherein the three-dimensional textile composite material comprises a thermoplastic material.

15. The material of claim 14, wherein the thermoplastic material comprises poly(p-phenyl sulfide); polyethylenimine; polyetherketone ketone; polyetherether ketone, or combinations thereof.

* * * * *